United States Patent [19]

Giraud

[11] Patent Number: 5,966,696
[45] Date of Patent: Oct. 12, 1999

[54] SYSTEM FOR TRACKING CONSUMER EXPOSURE AND FOR EXPOSING CONSUMERS TO DIFFERENT ADVERTISEMENTS

[75] Inventor: Stephen G. Giraud, Petaluma, Calif.

[73] Assignee: Infovation, Petaluma, Calif.

[21] Appl. No.: 09/059,592

[22] Filed: Apr. 14, 1998

[51] Int. Cl.$^6$ .................................................. G06F 17/60
[52] U.S. Cl. ......................... 705/14; 235/379; 235/380; 235/381; 235/383
[58] Field of Search ....................... 705/14, 4; 235/380, 235/381, 379, 383; 340/825.65

[56] References Cited

U.S. PATENT DOCUMENTS

| | | | |
|---|---|---|---|
| 4,795,889 | 1/1994 | Matuura et al. | 705/14 |
| 5,053,956 | 10/1991 | Donald et al. | 705/17 |
| 5,056,019 | 10/1991 | Schultz et al. | 705/14 |
| 5,305,197 | 4/1994 | Axler et al. | 705/14 |
| 5,504,675 | 4/1996 | Cragun | 705/14 |
| 5,537,312 | 7/1996 | Sekigushi et al. | 705/14 |
| 5,845,256 | 1/1998 | Pescitelli et al. | 705/4 |

OTHER PUBLICATIONS

Product Brochure Moneytel ATM Network, Apr. 14, 1998.

*Primary Examiner*—Allen R. MacDonald
*Assistant Examiner*—Romain Jeanty
*Attorney, Agent, or Firm*—Burns, Doane, Swecker & Mathis, LLP

[57] ABSTRACT

An advertising system is adapted to tracking consumer exposure to a number of different advertisements and to expose consumers to several different advertisements. The system simultaneously measures the number of consumers viewing different advertisements, while displaying different selected advertisements for viewing by the consumer. The system includes a display for displaying advertisements and other information. The system functions in either one of an idle mode, wherein potential consumers are not within a sensed proximity range, and an active mode, wherein the presence of potential consumers within the proximity range is detected. In the idle mode, the system displays programmed non-advertisement information. In the active mode, the display displays a programmed sequence of advertisements, that includes full-motion color commercials that may be interspersed with other information. A sound module may be provided for generating an audio portion of the advertisements. The time period of the active mode is sensed for determining the portions of the programmed sequence of advertisements that were displayed during the active mode, for determining particular advertisements that may have been viewed by the consumer to generate data. The data is retrieved from a host computer for determining what information in the active mode was displayed and the duration that the system was in the active mode for determining consumer presence and what portions of the active mode information may have been viewed by consumers.

23 Claims, 2 Drawing Sheets

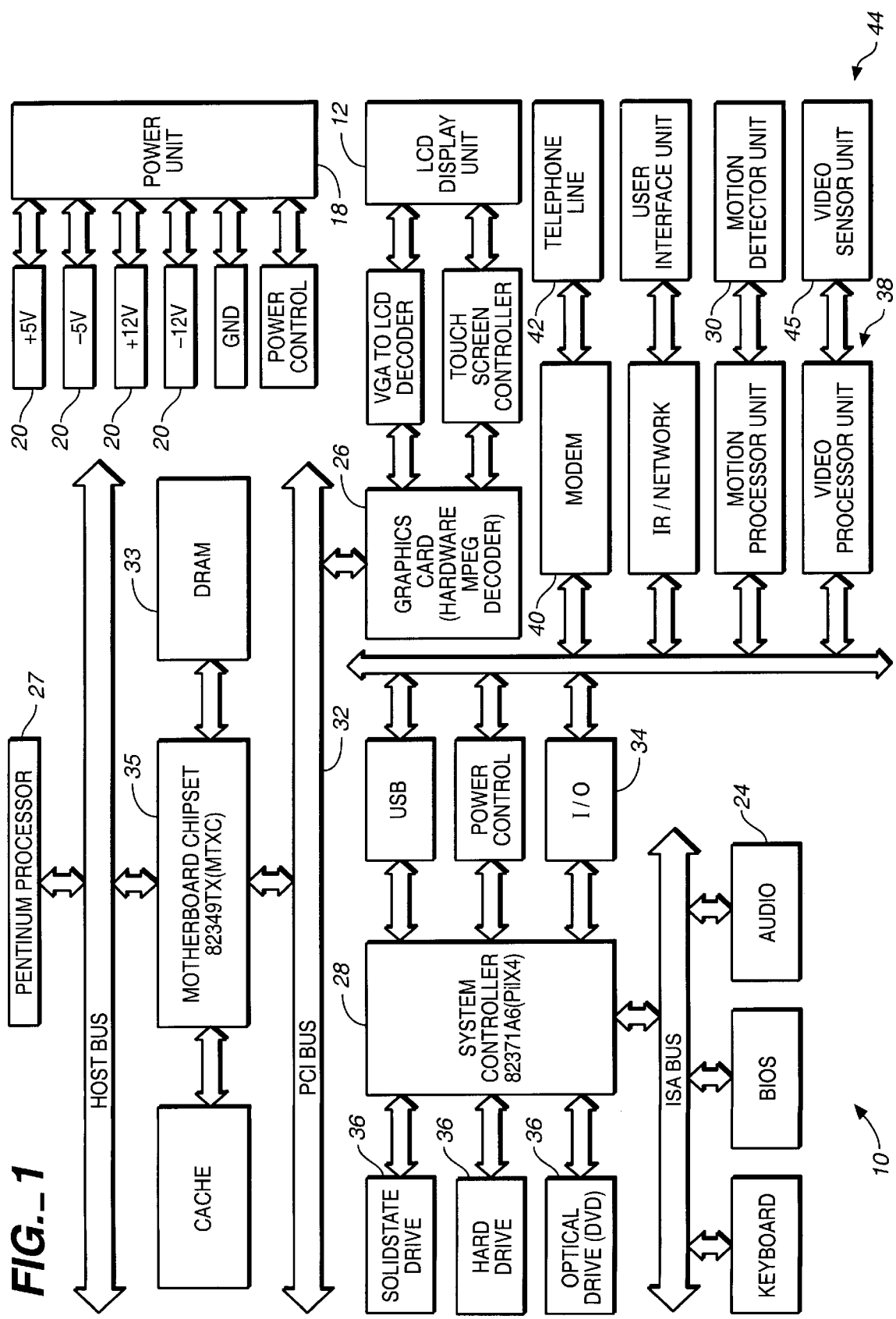
FIG._1

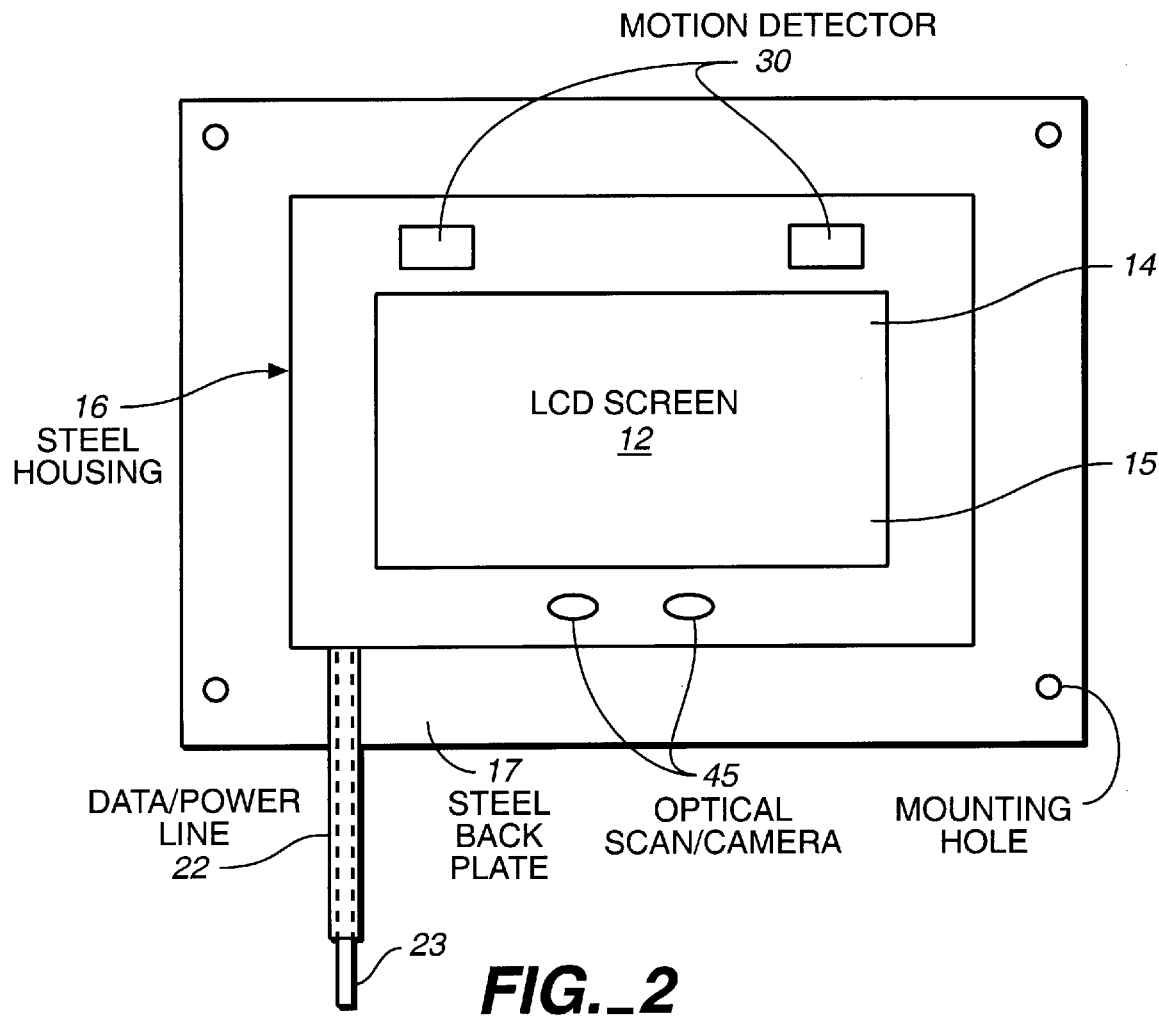
FIG._2
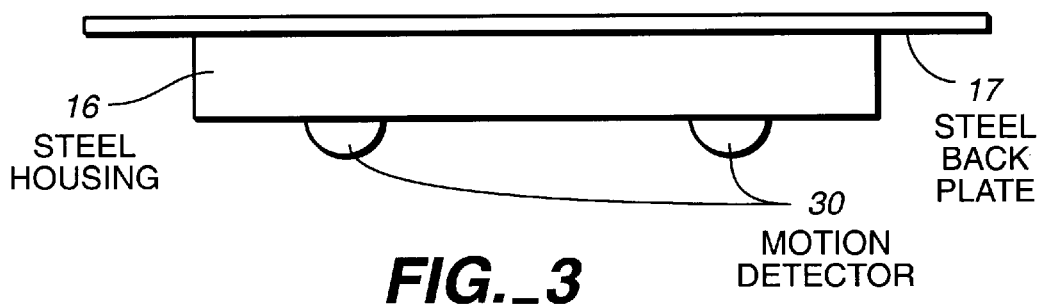
FIG._3

SYSTEM FOR TRACKING CONSUMER EXPOSURE AND FOR EXPOSING CONSUMERS TO DIFFERENT ADVERTISEMENTS

BACKGROUND OF THE INVENTION

1. Field of the Invention

The present invention relates to systems for tracking consumer exposure to promotional material.

2. Description of Related Art

Although electronic billboards and other forms of active advertising devices are known, an issue that presently exists in the advertising industry is the lack of accountability. Known advertising devices operate by projecting advertising information at large, regardless of the presence or absence of recipients of this information. However, simply issuing advertising information is no guarantee of the effectiveness of this information in reaching potential consumers and impacting the market for the product being promoted. Although the advertising industry is aware of this, current methods for measuring the number of consumers viewing an advertisement, which is important from many standpoints including marketing research and accounting purposes for the providers of the advertising service and their advertising clients, are arbitrary at best. Thus, there exists a need for a system that tracks consumer exposure to a number of different advertisements and that exposes consumers to several different advertisements.

SUMMARY OF THE INVENTION

A system in accordance with the invention tracks consumer exposure to a number of different advertisements or promotional segments and exposes consumers to several different advertisements. The system simultaneously measures the number of consumers viewing different advertisements, while displaying different selected advertisements for viewing by the consumer.

The system includes a projection means for projecting visual and/or audio advertisements and other information. Preferably the projection means comprises a display device such as a commercially available liquid crystal display (LCD) screen of suitable dimensions that is housed behind a protective shield for preventing harm to the screen due to vandalism or moisture such as rain, for example. The system functions in either one of an idle mode, wherein potential consumers are not within a sensed proximity range, and an active mode, wherein the presence of potential viewers within the proximity range is detected.

In the idle mode, the system preferably displays programmed non-advertisement information that may include a picture of a missing person with an associated telephone number for contacting law enforcement officials, current weather reports, traffic reports, trivia questions, and other similar information. Once the presence of at least one potential viewer within the proximity range is sensed, the active mode of the system is invoked and the display begins displaying a programmed sequence of advertisements that may include full-motion color commercials, stop-frame commercials, and other advertisements. Information such as trivia questions and famous quotations, for example, can be interspersed between the advertisements if desired.

Additionally, the projection means may comprise sound generating means. The sound generating means preferably generates an audio portion of the advertisements as they are being displayed by the display means. Optionally, the sound generating means may generate advertisements that are only audio, and may not accompany any video being displayed or may generate audio related to a stop-frame commercial or related to non-advertisement information on the display and for generating any associated audio. Once it is sensed that viewers are no longer present within the sensed proximity range, the idle mode is again activated for displaying the mode's associated non-advertisement information.

The system of the invention includes means for determining the activation time period of the active mode and for determining the portions of the programmed sequence of advertisements that were displayed during the active mode, for determining the particular advertisements that may have been viewed by the viewer. The system generates consumer tracking data representative of the time period that the active mode was invoked and portions of the sequence of advertisements that were displayed during the active mode and transmits the tracking data to a host computer.

The tracking data can then be retrieved from the host computer for determining what information in the active mode was displayed and the duration that the system was in the active mode, for determining consumer presence and what portions of the active mode information may have been viewed by potential consumers. Thus, the tracking data provides information that indicates the number of consumers that are present within the proximity range and viewing the display, along with the number of occurrences that particular advertisements were presented to potential consumers, since the location of each advertisement on the sequence is known. Therefore, the system of the present invention provides the advertising industry a higher level of accountability than existed in the prior art.

In the preferred embodiment, the system of the present invention further includes computing means coupled to the display means and to proximity sensing means for detecting the presence of potential consumers within the proximity range relative to the display screen. A memory means is coupled to the computing means and is provided for storing the information displayed during the idle and active modes. The memory means may also be utilized for storing the consumer tracking data prior to transmission of the data to the host computer.

The proximity sensing means may comprise any one of several commercially available motion sensors, heat sensors, or other sensors that are capable of detecting persons, or appropriate combinations thereof. Such motion sensors may include ultra-sound sensors or complex motion sensors operating with an object recognition algorithm. A plurality of ultra-sound sensors may be used for improving the accuracy and detection range of the system. Complex sensors, such as optical sensors or cameras, or combinations thereof, can be used for determining the shape of a viewer within the proximity range and for determining if a viewer is facing the display means, to determine if the viewer is actually viewing information being shown by the display. Suitable heat sensors include commercially available heat sensors and infrared detectors.

The invented system further includes communication means such as a modem or other known data transmission means for connecting one or more systems comprising the present invention to at least one host computer. A plurality of systems comprising the present invention can be coupled to the host computer via known data transmission lines and using known methods such as the Internet and Intranet. The communication means may also receive information, such as current weather reports and traffic reports for example, from the host computer or other data source coupled to the communication means.

The system of the invention is preferably retained in a suitable housing that will prevent damage, due to moisture or vandalism, for instance, to the system. In the preferred embodiment, the housing comprises a strong, waterproof material, such as stainless steel and is fabricated using well known methods.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 1 is a block diagram of a preferred embodiment of a system for tracking consumer exposure to a number of different advertisements and for exposing consumers to several different advertisements constructed according to the principles of the present invention;

FIG. 2 is a schematic front elevational view of a system in accordance with the present invention; and FIG. 3 is a schematic top elevational view of a system in accordance with the present invention.

DESCRIPTION OF THE PREFERRED EMBODIMENTS

Referring now to the drawing figures, there is shown generally at 10, a system in accordance with a preferred embodiment of the invention for tracking consumer exposure to a number of different advertisements and for exposing consumers to several different advertisements or promotional segements. The system 10 simultaneously measures the number of consumers viewing a number of different advertisements, while displaying different selected advertisements for viewing by the consumer.

The system 10 includes a projection means such as display means 12 for displaying advertisements and other information. Preferably, the display means 12 comprises a commercially available Liquid Crystal Display (LCD) screen, or other low power consumption screen, of suitable dimensions that may be housed behind a protective shield 14 (FIG. 2) for preventing harm from coming to the screen 12 due to vandalism or moisture such as rain, for example. The LCD screen 12 preferably ranges in size from approximately 11.5 to 52 inches, and may comprise a known TFT Active Matrix LCD screen. The protective shield 14 preferably comprises a strong translucent polycarbonate, such as Lexan, to prevent damage to the screen 12 due to impact forces. The protective shield 14 may have a layer of a commercially available scratch resistant material 15, such as that sold under the trademark VANDAL SHIELD. The scratch resistant material 15 prevents damage to the protective shield 14 due to vandalism such as scratches, and may have a layer of commercially available non-glare coating to minimize bright light glare in sunlight for example.

As shown in FIGS. 2 and 3, the system 10, and particularly the electronics thereof (to be discussed hereinafter), is preferably retained in a protective housing 16 that comprises a strong, waterproof material, such as stainless steel or other suitable material. The housing 16 is provided to prevent damage, due to moisture or vandalism for instance, to the system 10. The housing 16 includes a mounting plate 17 for securing the system 10 to a selected surface for viewing at a desired location.

An external 120V AC power source (not shown) is coupled to the system 10 via a power module 18, for providing electrical power to the system 10. The power module 18 first converts the 120V AC power to a 24V DC power level. The module 18 then converts the 24V DC to a number of different preferred electronic device power levels. The module 18 has power outputs 20 of levels +5V, −5V, +12V, −12V, so that the components of the system 10 do not suffer damage due to excessive power levels. The power module 18 is coupled to the system 10 via a waterproof, flexible conduit 22 (FIG. 2) which houses power source lines and data transmission lines 23.

The system 10 functions in either one of an idle mode, wherein potential consumers are not within a sensed predetermined proximity range or zone, and an active mode, wherein the presence of potential consumers within the proximity range is detected. In the idle mode, the system 10 preferably displays programmed non-advertisement information, that may include a picture of a missing person with an associated telephone number for contacting law enforcement officials, current weather reports, traffic reports, trivia questions, and other similar information. Once the presence of at least one potential consumer within the proximity range is sensed, the active mode of the system is invoked in a 15-second delay and the display 12 begins displaying a programmed sequence of advertisements and promotional segments that may include full-motion color commercials, stop-frame commercials, and other advertisements. Information such as trivia questions and famous quotations, for example, can be interspersed between the advertisements if desired. Once it is sensed that consumers are no longer present within the sensed proximity range, the idle mode is again activated for displaying the mode's associated non-advertisement information.

Additionally, the system 10 may comprise sound generating means 24. The sound generating means 24 preferably generates an audio portion of the advertisements as they are being shown on the display 12. Optionally, the sound generating means 24 may generate advertisements that are only audio, and may not accompany any video being shown or may generate audio related to a stop-frame commercial or related to non-advertisement information on the display 12 for generating any associated audio. In the preferred embodiment, the sound generating means 24 comprises a commercially available printed circuit board that includes data processing circuitry, and is commonly referred to as a "sound card." The audio level generated by the sound card 24 can be predetermined.

An MPEG graphics control and decoding unit 26 is coupled to the display 12 and to a microprocessor 27 of a computing means 28. The MPEG decoding unit 26 is coupled to the display 12 and microprocessor 27 for controlling information shown on the display 12. The MPEG decoding unit 26 performs MPEG data compression for transferring both video data and data status information. The MPEG decoding unit 26 enables the computing means 28 to be securely and efficiently utilized. The MPEG decoding unit 26 coacts with the sound card 24 to produce desired sound effects, so that the sound effects can be optionally played with or without the video on the display screen 12.

The system 10 of the present invention includes means for determining the activation time period of the active mode and for determining the portions of the programmed sequence of advertisements that were displayed during the active mode in order to determine the particular advertisements that may have been viewed by the consumer. The system 10 generates consumer tracking data representative of the time period that the active mode was invoked and what portions of the sequence of advertisements were displayed during the active mode and transmits the tracking data to a host computer (not shown).

In the preferred embodiment, the system 10 includes the computing means 28 coupled to the display screen 12 and to sensing system 38 for detecting the presence and behavior of potential consumers within a proximity range relative to the system 10, and particularly, relative to the display screen 12. The computing means 28 of the preferred embodiment consists of a commercially available Intel 486 microprocessor or Intel Pentium microprocessor based system that includes the microprocessor 27, a PCI data bus 32, temporary memory 33, data input and data output (I/O) support 34, and peripheral data processing devices 35 as is known.

A memory means 36 is coupled to the computing means 28 and is provided for storing the information displayed during the idle and active modes of the system 10. The memory means 36 may also be utilized for storing the consumer tracking data prior to transmission of the data to the host computer. The memory means 36 may comprise a known hard disk drive, such as one used in a portable computer, optical drive, or a solid state storage device, such as an EEPROM, FLASH EEPROM, or SRAM memory device array. Use of a CD ROM in lieu of a hard disk drive in order to conserve unit space and minimize cost is also contemplated.

After the consumer tracking data is generated, the tracking data can be retrieved from the host computer for determining what information in the active mode was displayed and the duration that the system 10 was in the active mode, for determining consumer presence and what portions of the active mode information may have been viewed by potential consumers. The tracking data can additionally be used for billing users of the invented system 10.

Thus, the tracking data provides information that indicates the number of consumers that are present within the proximity range and viewing the display 12, along with the number of occurrences that particular advertisements were presented to potential consumers, since the location of each advertisement on the sequence is known. Therefore, the system of the present invention 10 provides the advertising industry a higher level of accountability than existed in the prior art.

The sensing system 38 may comprise any one of several commercially available motion sensors 30, such as heat or optical sensors, or other sensors that are capable of detecting persons, or appropriate combinations of known sensors of the same or different types. Sensing system 38 may include ultrasound sensors operating in conjunction with complex detection devices 44 whose outputs are subject to prescribed pattern recognition algorithms. As an example, motion sensors 30 may comprise ultrasound sensors having adjustable proximity ranged for improving system accuracy and detection range. Motion sensors 30 operate to trigger the active mode of the system 10, which is recorded and analyzed, and also to trigger operation of complex detection devices 44 designed to recognize specific patterns such as a viewer's eyes or face direction. A plurality of ultrasound sensors may be used for improving the accuracy and detection range of the system. Ultrasound sensors 30 provide an adjustable proximity range. Those skilled in the art will recognize that any combination of operating procedures for the system 10 and the sensors 30 and detection devices 44 may be utilized without departure from the spirit and scope of the invention.

Complex detection devices shown generally at 44, that may include or comprise cameras, optical scanners, or combinations thereof, can be used for determining the shape of a viewer within the proximity range and for determining if the viewer is facing the display 12, to determine if the viewer is actually viewing information being shown by the display 12. For example, the complex detection devices 44 may include one or a combination of video cameras, digital cameras or optical scanners 45 for recognizing the shape of viewers and/or their viewing direction within a viewing range of the cameras 45. A viewer's intention can be determined by triggering a sensor system 38 to locate two concentric circles spaced approximately 1 to 2 inches apart. Once the characteristics of the consumer facing the display 12 are detected, the sensor system 38 processes and stores detailed information relating to the characteristics of the consumer for later analysis by the system 10 or host computer. This information may be used for billing and status information of the system 10 at a particular location, or for a number of different systems 10 placed at a number of different locations. Of course, the functions of sensors 30 and detection devices 44 may be integrated into a common device such that detection devices 44 may for example operate to sense the presence of a viewer and then proceed to analyze patterns related to the viewer which are indicative of his/her attentiveness to the system 10.

The system 10 further includes communication means such as a modem 40 or other known data transmission means for connecting one or more systems comprising the present invention 10 to at least one host computer. A plurality of systems 10 comprising the present invention can be coupled to the host computer via known data transmission lines 42 and using known methods such as the Internet and Intranet. The communication means 40 may also be utilized to enable the system 10 to receive information, such as current weather reports and traffic reports for example, from the host computer or other data source coupled to the communication means. Of course data transmission is not confined to transmission lines 42 as the use of wireless communication between the systems 10 and the host computer is also contemplated by the invention.

Thus, the system of the present invention simultaneously measures the number of consumers viewing different advertisements, while displaying different selected advertisements for viewing by the consumer. The system functions in either one of the idle mode, wherein potential consumers are not within a sensed proximity range, and the active mode, wherein the presence of potential consumers within the proximity range is detected. In the idle mode, the system displays programmed non-advertisement information. In the active mode, the system displays a programmed sequence of advertisements, that includes full-motion color commercials that may be interspersed with other information. The time period of the active mode is sensed for determining the portions of the programmed sequence of advertisements that were displayed during the active mode, for determining particular advertisements that may have been viewed by the consumer to generate consumer tracking data. The tracking data is retrieved from a host computer for determining what information in the active mode was displayed and the duration that the system was in the active mode for determining consumer presence and what portions of the active mode information may have been viewed by consumers The above are exemplary modes of carrying out the invention and are not intended to be limiting. It will be apparent to those skilled in the art that modifications thereto can be made without departure from the spirit and scope of the invention as set forth in the following claims.

What is claimed is:

1. An information generating and tracking device adapted to track exposure of a person to active mode programming, the device comprising:

a sensor system for determining the presence of the person in a predetermined receiving range;

a projection means for communicating active mode information to the person when the person is in the predetermined receiving range; and a processor for generating exposure information representative of the amount of active mode information communicated by the projection means to the person.

2. The device of claim 1, wherein the active mode information comprises one or more promotional segments each lasting a predetermined duration, the exposure information representing, for a predetermined period of time, the number of times each promotional segment was communicated by the projection means.

3. The device of claim 1, wherein the active mode information comprises one or more segments of advertising each lasting a predetermined duration, the exposure information representing, for a predetermined period, the total communication time of each segment by the projection means.

4. The device of claim 1, wherein the projection means outputs idle mode information in the absence of a person from the predetermined range.

5. The device of claim 4, further comprising an information storage means for storing at least one of said active mode information and idle mode information.

6. The device of claim 4, further comprising a data link for providing at least one of said active mode information and idle mode information to the projection means.

7. The device of claim 1, further comprising a data link for transferring the exposure information to a host computer disposed at a location remote from the information generating and tracking device.

8. The device of claim 7, wherein the host computer is adapted to receive exposure information from a plurality of information generating and tracking devices.

9. The device of claim 1, wherein the projection means communicates the active mode information to the person in audio form.

10. The device of claim 1, wherein the projection means communicates the active mode information to the person in visual form.

11. The device of claim 10, wherein the projection means comprises an LCD display.

12. The device of claim 1, wherein the projection means communicates the active mode information to the person in audio-visual form.

13. The device of claim 1, wherein the sensor system comprises one or more detectors selected from the group consisting of a photodetector, a camera, an ultrasound detector, and a heat detector.

14. The device of claim 13, wherein the sensor system comprises an object recognition algorithm.

15. The device of claim 14, wherein the object recognition algorithm recognizes a pair of eyes of the person.

16. The device of claim 1, wherein the sensor system comprises:

a complex detection device operating in accordance with a recognition algorithm, the complex detection device adapted to recognize patterns indicative of a person's viewing direction.

17. The device of claim 16, wherein the sensor system comprises a motion sensor for activating the complex detection device.

18. A method for tracking consumer exposure to promotional information, the method comprising:

sensing the presence of a person in a predetermined projection zone;

projecting, in an active mode, one or more promotional information segments into the predetermined projection zone when the person is in the predetermined projection zone; and generating exposure information by calculating the number of times each promotional information segment was projected into the predetermined projection zone.

19. The method of claim 18, further comprising the step of projecting, in an idle mode, non-promotional information when the presence of a person in the predetermined projection zone is not sensed.

20. The method of claim 18, further comprising the step downloading the exposure information to a remote host computer.

21. The method of claim 19, further comprising the step of uploading at least one of the promotional information segments and the non-promotional information from a remote host computer.

22. The method of claim 18, wherein the step of sensing comprises using one or more detectors selected from the group consisting of a photodetector, a camera, an ultrasound detector, and a heat detector.

23. The method of claim 22, wherein at least one detector is adapted to operate in conjunction with an object recognition algorithm.

* * * * *